Oct. 27, 1931.  A. M. ROSSMAN  1,828,948
ADJUSTABLE SPEED DRIVE ADAPTED FOR TRACTION PURPOSES
Filed May 4, 1929    4 Sheets-Sheet 3

Inventor
Allen M. Rossman
By Brown, Jackson, Boettcher & Dienner
Attys.

Oct. 27, 1931.  A. M. ROSSMAN  1,828,948
ADJUSTABLE SPEED DRIVE ADAPTED FOR TRACTION PURPOSES
Filed May 4, 1929  4 Sheets-Sheet 4

KEY
/ D.C. Motor Motoring
// D.C. Motor Generating
| D.C. Motor Idling A.C. Motor Inventor
Allen M. Rossman
By Brown, Jackson, Boettcher + Dienner
Attys.

Patented Oct. 27, 1931

1,828,948

UNITED STATES PATENT OFFICE

ALLEN M. ROSSMAN, OF WILMETTE, ILLINOIS, ASSIGNOR, BY MESNE ASSIGNMENTS, TO ROSSMAN PATENTS, INCORPORATED, OF CHICAGO, ILLINOIS, A CORPORATION OF ILLINOIS

ADJUSTABLE SPEED DRIVE ADAPTED FOR TRACTION PURPOSES

Application filed May 4, 1929. Serial No. 360,400.

My invention relates to drives for driving a load at any speed within a given range from zero to maximum. While in the specific embodiment which I shall describe the invention is applied to an electric railway system, it is to be understood that the invention is not to be limited to such field but may be employed generally, and while specifically I show a main alternating current motor of fixed speed and a direct current motor of variable speed connected to each other and to the load in differential relation for securing any desired speed within the predetermined range of operation, I do not intend by this to exclude the use of other and equivalent mechanisms or motors but intend to include, broadly, devices and combinations which are the equivalent of those herein shown within the broad teaching of my invention.

In approaching the problem of driving an electric locomotive or other motor car by power taken from commercial three-phase alternating current mains, I have conceived the possibility of employing alternating current three-phase sixty cycle trolley wires and squirrel cage alternating current motors or their equivalents as the main elements for converting electrical power into mechanical energy applied at the driving wheels. I speak herein of the electrical locomotive as typical of any form of electrically controlled motor car or other load which it is desired to drive and/or brake.

The use of squirrel cage motors as the main operating elements involves the problem of utilizing the power at fixed speed for operating an inherently variable speed load. The squirrel cage induction motor is the simplest and most rugged electro-mechanical unit known, and as it operates at relatively high speed can supply its own ventilation. Its efficiency is high; it has no sliding contacts such as a commutator or collector rings and can, therefore, operate at high speed without difficulty and deliver more horse power per pound or per cubic foot than a slower speed motor of the same output. It also has a higher ratio of pullout torque to running torque than slower speed motors of the same type.

I have conceived that by the use of a differential coupling between such a main motor and the load, and an auxiliary motor of variable speed characteristics it is possible to accelerate the load from zero to any selected maximum value.

The fundamental requirement is that the two motors and the load be connected differentially and be suitably controllable. While I speak of the main motor as a fixed speed motor, in practice I prefer to employ a squirrel cage type induction motor capable of giving two speeds, such as 600 and 1200 revolutions per minute. The driving torque applied to the axle is exerted by two motors, namely the main squirrel cage motor, above referred to, the speed of which may be zero, 600 and 1200, for example, and the variable speed auxiliary or starting motor, the speed of which is variable and controllable from zero to a point equivalent to approximately one-half of the lower speed of the alternating current main motor.

This auxiliary motor in the preferred form of my invention is a direct current motor, but I conceive that it is not essential that this be a direct current motor within the broad scope of my invention as a variable speed alternating current motor may be employed instead with certain advantages, as will more fully appear later.

In the preferred scheme herein illustrated the direct current motor is employed mainly because of the ready ability to regenerate so much of the power of the main alternating current motor as is subtracted from or added to the drive in order to gain the variable speed relation. An essential concept of my invention is the balancing of the torques of the two main motors against each other and the load and employing a variable speed motor additively or subtractively with respect to the main motor, when such main motor is operating at zero speed or at its low fixed speed or at its high fixed speed in order to cover the range from zero to maximum in either direction.

The preferred method of accelerating the load from minimum to maximum speed comprehends accelerating the load from zero by means of the variable speed motor, the main motor being held at zero speed, then applying the torque of the fixed speed motor to the load and subtracting a part of the speed of the main motor from the load by driving the variable speed motor, then adding the speed of the variable speed motor to that of the main motor while opposing their torques against each other and against the load. In this way, by successively adding and subtracting the speed of the variable speed motor with respect to the main motor and the load it is possible to start the locomotive, for example, from zero and accelerate to a predetermined maximum, which may be any speed determined by the design.

The manner of deceleration is exactly the reverse. Where the constant speed motor previously acted as a motor to give out mechanical power it now acts as a generator to absorb mechanical energy and return electrical power to the line. Likewise, the variable speed motor on deceleration of the load absorbs mechanical power where it supplied it on acceleration and vice versa.

While I speak of a main squirrel cage motor of two fixed speeds of, for example, 600 and 1200, it is within the teaching of my invention to employ a main motor which will have more than two fixed speeds as, for example, zero, 600, 1200 and 1800, which may be secured by the use of two separate windings, one of which windings would be designed to give two speeds.

The preferred manner of connecting the two motors and the load is through the use of a differential gear. This differential gear in the preferred form is of the planetary type, but this is optional. In the preferred form the main motor is connected to the central pinion of the planetary gear; the auxiliary motor is connected to the ring gear or orbit gear, and the axle is connected to the case which carries the planetary gears.

Now it may be seen that the axle may be driven by either motor acting alone, if the other motor is not permitted to revolve, or by both motors acting in multiple. When both motors are running the speed of either one may be varied independently of the other. The change in motor speed is always reflected in a corresponding change in the speed of the axle. I take advantage of this characteristic to make the main motor constant speed and the auxiliary or starting motor variable speed. In the preferred form herein shown, the main motor, which is of the constant speed squirrel cage type induction motor and capable of giving two speeds, such as 600 and 1200 R. P. M. is directly connected to the sun gear of the differential gearing. A variable speed direct current motor is geared to the orbit gear and the cage bearing the planetary gears or pinions is geared to the driving axle. Such gear ratios are chosen that 720 R. P. M. of the direct current motor are equivalent to 300 R. P. M. of the alternating current motor.

With the alternating current motor running at 1200 R. P. M. and the direct current motor at 720 R. P. M. the locomotive will be running at its maximum speed, which will be designated as 100%. As 720 R. P. M. of the direct current motor are equivalent to 300 R. P. M. of the alternating current motor, if the direct current motor be brought to rest, the axle speed will be reduced to 80%. If the direct current motor be run at 720 R P. M. in the reverse direction, the axle speed will be further reduced to 60%.

Likewise with the A. C. motor running at 600 R. P. M. and the D. C. motor at rest the axle speed will be 40%. The axle speed may then be varied by the D. C. motor plus or minus 20% or between the limits of 60% and 20%. With the A. C. motor at rest, the D. C. motor operating alone may vary the axle speed between the limits of 20% and 0. In this manner the axle speed may be made to cover its complete range from 100% to 0.

The maximum power requirement is at maximum speed. At this speed both motors are operating against the same axle torque. The horse power delivered by each is, therefore, directly proportional to the speed at which each, acting alone, would drive the axle against this torque. These values are; for the A. C. motor 80%, for the D. C. motor 20%. That is, the rating of the D. C. motor is but $\frac{1}{5}$ of the maximum power requirement of the axle.

Speed control of the D. C. motor is accomplished by varying the voltage impressed on its armature terminals. This variable voltage is supplied by a motor generator set.

While the D. C. motor is adding speed to the axle it draws energy from the motor generator set. While the A. C. motor is operating at a speed higher than that required by the axle, the horse power equivalent of this excess speed is utilized to drive the D. C. motor as a generator, and it then delivers energy to the motor generator set.

The direction of rotation of the D. C. motor is reversed by bringing the voltage impressed on its armature terminals down to zero, and then building it up in the opposite direction. The direction of current flow through its armature does not change with the change in direction of rotation.

For the same horse power requirement the motors and, with the exception of the gear on the axle and the driving gear that meshes with it, the gears are interchangeable on freight and passenger locomotives. The axle gear ratio must be varied to suit the different speed requirements.

Each A. C. motor is provided with a brake to hold it at a standstill while the D. C. motors start the locomotive and carry it over the first step of its speed cycle There is no rubbing action between the motor and the brake, as the brake is applied only when the A. C. motor is at rest. Other holding means than a brake may be employed if desired.

The D. C motors are compound wound, their main windings being separately excited. Unaided by the A. C. motors they start the locomotive and carry it over the first step of the speed cycle. At this point the series fields of the D. C. motors are short circuited and are not in use during the remainder of the speed cycle. From then until the locomotive reaches its maximum speed, they cover their cycle from maximum in one direction, through zero, to the maximum in the opposite direction, twice. They thus cover their speed range between zero and maximum five times while the locomotive covers its speed range once. These figures do not include the periods when they idle the A. C. motors from one speed to another which will be discussed later. It is to be understood that the D. C. motor may, if desired, be a straight separately excited motor throughout Because they will at times carry large currents while at standstill or while operating at low speeds, the D. C. motors must be forced ventilated.

The A. C. motor on the motor generator set may be of either the induction or synchronous type. If synchronous, it would be made oversize so that it may be operated with a leading current to keep the power factor of the energy drawn by the locomotive high.

The rating of the D. C. generator is equivalent to the sum of the ratings of the D. C. motors that it controls. For a four axle drive locomotive, the rating of the motor generator set would be equivalent to that of one of the A C. motors. The generator is designed to handle currents up to its maximum rating with no current flowing in the field windings. At such times it acts merely as a conductor of low resistance for the current generated by the D. C. motor acting as a generator.

Two direct connected exciters are provided. One operates at constant voltage. It furnishes energy for exciting the main field coils of the D. C. motors, and for control purposes. The second exciter operates at variable voltage by means of field control. It furnishes energy for exciting the fields of the D. C. generator of the motor generator set. If used in multiple unit control operation, this exciter should be of sufficient capacity to furnish the excitation for as many motor generator sets as there are units to be controlled.

An inherent characteristic of a locomotive operating on this system is its tendency to hold a constant speed on each controller setting. In going downgrade the locomotive automatically starts to regenerate in order to hold this speed. To decelerate under regenerative control the operator merely backs off the controller and watches the instruments to see that the motors are not unduly overloaded. No additional accessories are required to make the equipment suitable for regenerative control between the speed limits of 100% and 20%; that is, while the D. C. motors are operating as separately excited machines.

The elimination of rheostatic control on acceleration and the substitution to a large extent of regenerative braking for friction braking tend to make substantial savings in power consumption.

Now in order to acquaint those skilled in the art with the manner of constructing and operating a device embodying my invention, I shall describe in connection with the accompanying drawings a specific embodiment of the same.

In the drawings:

Figure 1 is a diagram of a system of locomotive drive embodying my invention;

Figure 1—A is a diagram of connections of a transformer primary for three-phase operation;

Figure 1—B is a diagram of connections of a transformer primary for single-phase operation;

Figures 1, 1A, 1B:
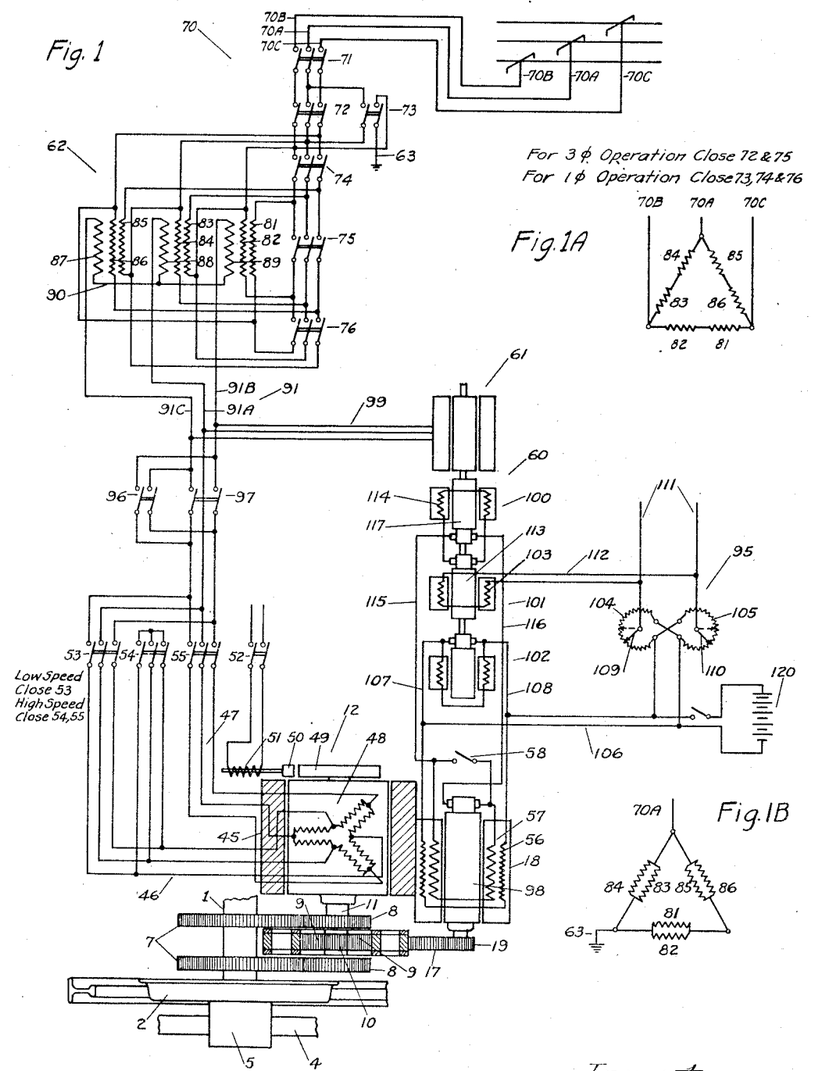
Figure 2:
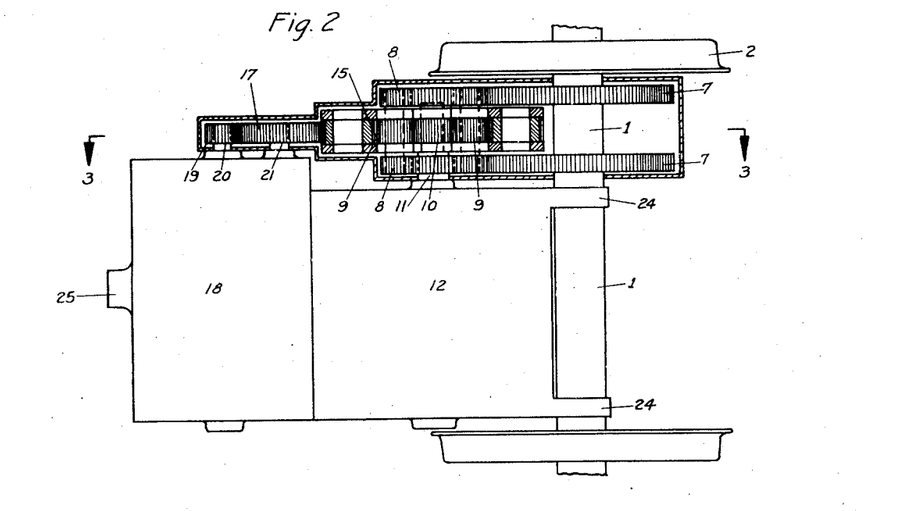
Figure 2 is a plan view partly in section of the motors, the differential gear and the driving axle.
Figure 3:
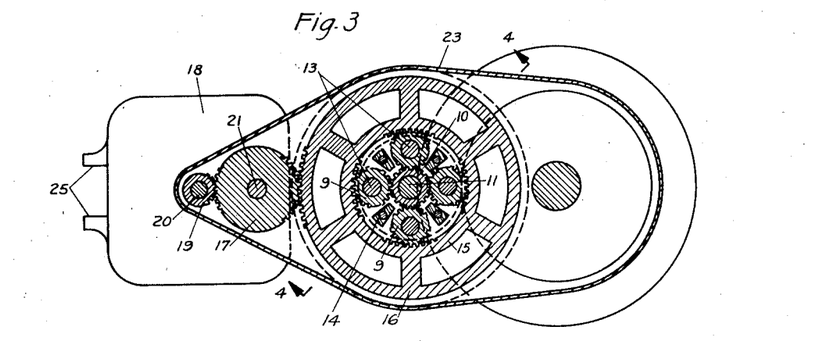
Figure 3 is a vertical section taken on the line 3—3 of Figure 2.
Figure 4:
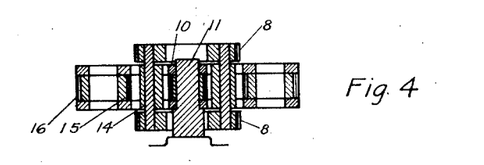
Figure 4 is a cross section through the differential gear taken on the line 4—4 of Figure 3.
Figure 5:
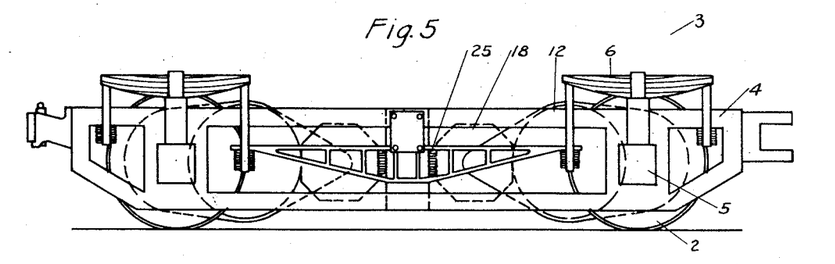
Figure 5 is a side elevational view of a truck embodying the drive of my invention.

Referring now to Figure 1, the driven axle is indicated at 1, this axle operating through the drive wheel 2 to drive the locomotive. In Figure 5 I have shown a truck 3 of the articulated type showing the manner of mounting the driving axle in a suitable truck frame 4, as by means of a suitable journal box 5, said journal box being connected through springs such as 6 to the frame 4.

The axle 1 carries a pair of gears 7, 7 keyed thereto. These gears mesh with the pinions 8, 8 fastened to or forming a part of the gear cage carrying the planet pinions 9, 9, the planet pinions in turn meshing with the sun gear 10 mounted on the shaft 11 of the main alternating current motor 12. The pinions 8, 8 are connected together through journal pins 13, 13 upon which the planet pinions 9, 9 are journaled.

Likewise the gears 8, 8 are connected by posts or pillars 14, 14 spacing the two gears 8, 8 in proper relation and connecting them for forming a cage through which the motion of the planet pinions 9, 9 is transmitted to the gears 7, 7 and thence to the axle 1.

The planet pinions 9, 9 mesh with an internal orbit gear 15 upon the outside of which is mounted a spur gear 16 for connection through the idler 17 with the pinion 19 of the direct current motor 18. Pinion 19 is mounted on the shaft 20 of the direct current motor 18 and the idler 17 is mounted on a journal pin 21 fastened to the frame or casing of the direct current motor 18. The gear case 23 houses the gears and contains a bath of oil for lubricating the same. The sun gear 10, the pinions 9, and the orbit gear 15 have cylindrical roller surfaces flush with their pitch circles so that a rolling contact is maintained between said sun gear, planet gears, and orbit gear.

The frame of the motor 12 is provided with ears or lugs 24, 24 embracing the axle 1, by means of which a part of the weight of the motors 12 and 18 is suspended on the axle directly. The two motor frames or casings are bolted together and the frame of the motor 18 is provided with a nose 25 by which through cushion springs the motors are connected to a transverse frame member on the truck frame 4. The spring connection 25 is indicated in Figure 5. Thus the two motors 12 and 18 are connected differentially to the driving axle 1, with the direct current motor 18 at a mechanical advantage with respect to the alternating current motor 12.

Figure 6:
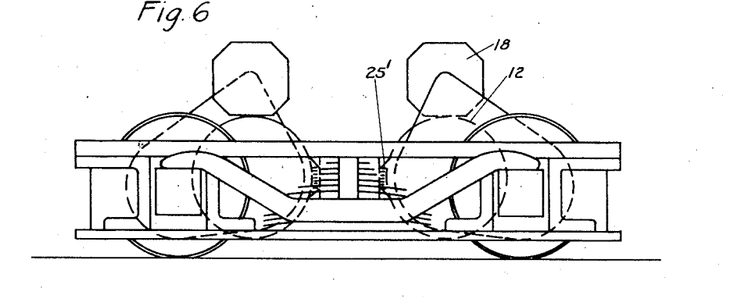
Figure 6 is a similar view of a modified form of the same.
Figures 7, 8:
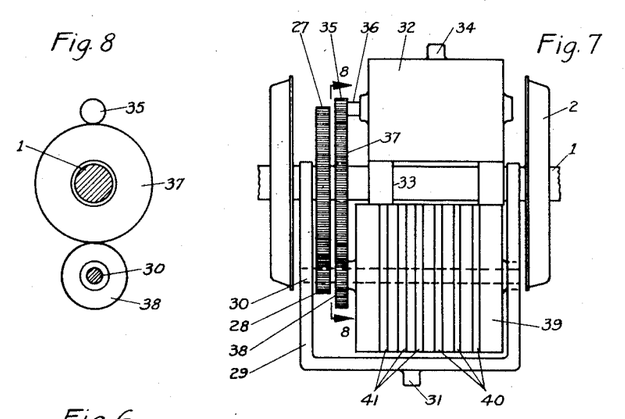
Figure 7 is a view like Figure 2 of a modified form of gear connecting the two motors and the driven axle.
Figure 8 is a sectional view taken on the line 8—8 of Figure 7.

Figure 6 shows a modified form of truck and motor arrangement in which the direct current motor 18 is swung above the alternating current motor 12, the gear connections remaining the same. In this case the motor 12 is provided with the supporting nose 25' for connecting through buffer springs the frame of the motor to a transverse frame member, as is well understood by those skilled in the art. Instead of connecting the two motors differentially through gears, the differential connection may be secured electrically by making both members of one of the motors, for example the alternating current motor, rotatable. Thus in the form shown in Figures 7 and 8 the axle 1 has a gear 27 keyed thereto. The gear 27 is driven by the pinion 28 which is mounted upon the frame 29 slung upon the axle 1. That is to say, the frame 29, which is a U-shaped frame, has bearings on the motor shaft 30 and said U-shaped frame with the motor shaft thereon swings about the axle 1 at a fixed radius so as to maintain the pinion 28 in mesh with the gear 27. The frame 29 is provided with a suitable suspension nose 31, and the direct current motor 32 which is slung on legs or ears 33 is likewise provided with the suspension nose 34 so that the frame of the truck in which the device of Figure 7 is mounted takes up the torque reaction through said noses 31 and 34.

The direct current motor 32 has a pinion 35 mounted upon its shaft 36. This pinion 35 meshes with the idler gear 37 journaled upon the axle 1 and meshing with the pinion 38 secured to the rotating outer member of the alternating current motor 39. Thus the outer member 39 which carries the windings is provided with two sets of slip rings 40 and 41 through which connections may be controlled for operating at speeds of, for example, zero, 600 and 1200 R. P. M.

Thus the outer member of the motor 39 is geared to the rotatable member of the direct current motor and the inner rotatable member of the alternating current motor 39 is geared to the axle. Thus the torques of the two motors are balanced against each other at all times and balanced against the load represented by the axle 1.

The gear ratio may be varied within suitable limits. In the particular embodiment herein shown the ratio of the gears of the direct current and the alternating current motors is 1 to 2; that is to say, two revolutions of the the direct current motor are equivalent to one revolution of the alternating current motor applied to the load. The ratio which exists between the differential gear and the axle, that is the reduction from the motors to the load, may be controlled by varying the sizes of the gears 7 and 8. Obviously, for a passenger locomotive the speed of the axle should be higher for maximum speed of the motors. Since the same torque as modified by the gearing appears on both motors, it can be seen that the ratio of work performed for equal speeds of the two motors is in proportion to their gear ratios.

Referring now to Figure 1, the stator 45 of the main motor 12 has two sets of leads 46 and 47 through which the speed thereof may be controlled to give the fixed speeds of zero, 600, 1200 R. P. M. The rotor 48 is provided with a brake drum 49 to which the brake member 50 may be applied as by means of the magnet 51 and its controlling switch 52. Thus if the control switches 53, 54, 55 are opened by suitable interlock connections, the control switch 52 may be closed to apply the brake shoe 50 to the drum 49 for holding the rotor 48 stationary.

The direct current motor 18 has two field windings, namely the main windings 56 which are separately excited and the series winding 57. The short circuiting switch 58 for shorting out series winding 57 is provided.

A suitable motor generator set 60 has an induction motor 61 supplied with alternating current from the transformer 62 which also supplies the main alternating current motor 12. The motor 61 instead of being an induction motor of the squirrel cage type might be a synchronous motor, which by suitable field excitation may be employed to improve the power factor of the unit.

The primary side of the transformer 62 is connected to the overhead trolley wires through suitable collector mechanism consisting of the pantograph shown in my copending application, Serial No. 357,538, filed April 23, 1929, or other suitable means. By this pantograph mechanism and the changeover connection the flow through two of the phases of the supply line may be disconnected so that the transformer is connected to a single phase supply or phase to neutral, the neutral being connected to the track as explained in said copending application. Also instead of dropping two of the phases and operating between phase to neutral, one of the phase wires may be disconnected and the system operated on a single phase two wire trolley. The main switch 71 controls the leads extending to the transformer or collector. When the switch is open the entire locomotive is dead. The transformer 62 has three pairs of primary windings, namely, 81, 82, 83, 84, 85 and 86 which may be connected together in delta connection with the pair 81, 82 in series in one leg, the pair 83, 84 in series in another leg, and the pair 85, 86 in series in the third leg, when switches 72 and 75 are closed.

These same pairs may be connected in parallel with each other and in the three legs of a closed delta connection connected between one phase and ground when the switches 73, 74 and 76 are closed and the switches 72 and 75 are open. In Figure 1A I have indicated connections for the primary side of the transformer 62 when the normal three-phase connection is in effect. The secondary windings 87, 88 and 89 of the transformer 62 are connected together in star through a common star connection 90 at their inner ends and to the leads 91 at their outer ends. The switches above referred to for changing from three-phase to single phase operation are automatically controlled by suitable changeover mechanism, all as set forth in my copending application Serial No. 357,539, filed April 23, 1929. Switches 96 and 97 are employed for reversing the direction of rotation of the main motor 12. That is to say, when switch 97 is closed the main motor 12 is driven forward, switch 96 at this time being opened. When the switch 96 is closed and switch 97 is open the motor will be driven in a backward direction. Switches 96 and 97 and a reversing switch of the armature 98 of the direct current motor 18 are under the control of the reversing switch in the main controller in the cab of the locomotive.

The switches 52, 53, 54 and 55 together with the rheostat 95 are under the control of the main controller in the cab of the locomotive. This is all explained in my copending application, Serial No. 365,832, filed May 25, 1929. However, for the purposes of this application these switches might be operated in suitable sequence by hand.

The alternating current motor 61 of the motor generator set 60 is connected through leads 99 secured to the leads of the transformer indicated at 91.

The motor 61 has connected thereto three direct current machines, namely, 100, 101, 102. The machine 102 is an exciter for supplying current for the field windings of the separately excited field 56 of the direct current motor 18 and for supplying the field windings 103 of the generator 101. A pair of rheostat windings 104, 105, are bridged across the leads 106, which leads are connected to the armature terminals of the shunt wound exciter 102. The rheostat 95 having the stators 104 and 105 is provided with contactors 109 and 110 adapted to be operated in unison for supplying the leads 111 with current at a variable potential. Thus the leads 111 may be led throughout the locomotive for control purposes of the exciters 101 for governing the separately excited windings of the generators 100 and they in turn governing the armature current of the direct current motors 18; Likewise they may be led to the various units of a multi-unit train or the like for simultaneous control of the armature currents of the traction motors, such as 18.

While I have shown the train line control leads 111 led from the rheostat 95, in practice I prefer to take the same from the armature leads of armature 113 of exciter 101, as the current here available is greater than at rheostat 95. Thereby all generators 100 are excited from the armature terminals of exciter 101.

Leads 112 connected to the variable potential exciter leads 111 are connected to the field 103 of the exciter 101 so as to vary potential and, hence the current flow generated in the armature 113 of said exciter 101. The field winding 114 of the exciter 100 is connected across the leads of the armature 113 of the machine 101.

Thus the draft of current from the leads 111 may be small, and the current flowing in the leads 115 and 116 to connect the armatures 117 of the generator 100 and the armature 98 of the traction motor 18 in series may be relatively great. Where only a single traction motor is to be served the field of the generator 100 may be connected directly to the leads 111 without the interposition of the exciter 101.

Operation

Figure 9:
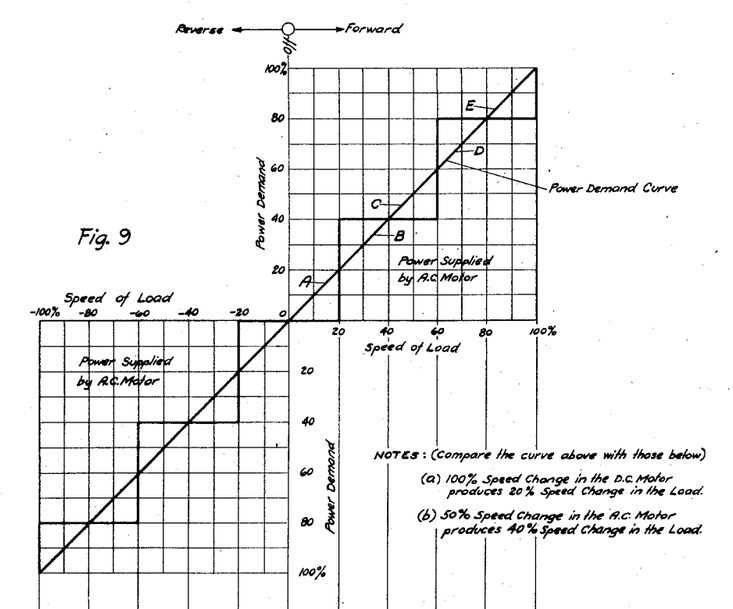
Figures 9, 10 and 11 are diagrams illustrating the operation of the mechanism.
Figure 10:
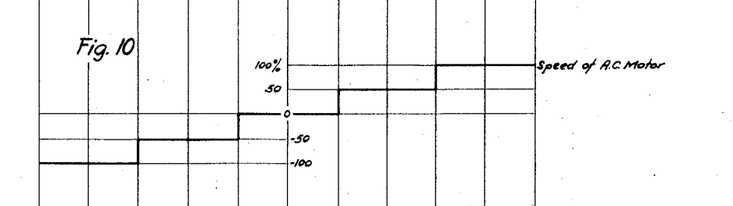
Figure 11:
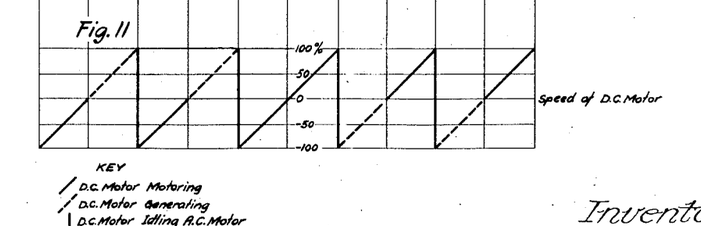

The operation of the drive herein disclosed will be more readily apparent by reference to the curves of Figures 9, 10 and 11.

To put the system in operation, the main switch 71 is closed and depending on whether three phase operation or single phase operation is to be employed, and this, as will be understood by reference to my copending application Serial No. 357,540, filed April 23, 1929, is automatically controlled by track contacts, or the like, the primary windings of the transformer 62 will be suitably closed to the source of supply whether three phase or single phase. If three phase operation is to be carried out switches 72 and 75 are closed providing the primary winding connection indicated in Figure 1A. The secondary of the transformer 62 is connected in star or Y and remains such at all times. As soon as the secondary leads of the transformer 62 are energized by three phase current, the motor generator set 60 is put into operation, the three phase current driving the induction motor 61 or synchronous motor, depending upon which is employed. Either may be employed. If the locomotive is to be put into operation on single phase the motor generator set may be started by the use of a storage battery connected to the exciter 102. For forward drive of the main motor 12, which is a fixed speed motor, switch 97 is closed and where the main motor is to operate on its lower range of speed, as for example 600 R. P. M., the switch 53 is closed and switches 54 and 55 remain open.

The control of the switches 53, 54 and 55 is properly correlated in the controller which is disclosed in my copending application Serial No. 365,832 to provide the suitable speeds of zero, 600 and 1200, for example, at the appropriate times in the acceleration of the cycle of the drive.

The rheostat 105 is provided with current from the exciter 102 which is constantly driven by the motor 61. For zero speed of the variable speed motor 18, the arms 109 and 110 are placed in the middle or dotted line positions as shown in Figure 1, so that substantially zero potential appears upon the leads 111 and 112. The result is that the excitation of the generator 101 is zero and likewise the excitation of the generator 100 is zero. Therefore, current is not generated in the generator 100 and the variable speed motor 18 is not energized. That is to say, its speed is zero.

In an installation where the variable speed motor supplies approximately one-fifth of the maximum power required by the drive, the generator 100 should be of a capacity somewhat in excess of the same in order to avoid overload. If more drive units are employed on the locomotive the capacity of the motor generator set should be proportionately increased. The variable speed motor since it will operate during a part of its cycle at relatively low speed is cooled by forced ventilation, whereas the speed of the main motor 12 when current is flowing therein is always high enough to insure its own ventilation.

Assume now that it is desired to start the load, that is to drive the locomotive from zero speed and to accelerate it or its connecting load. The first phase of operation involves closing of the switch 52 to apply the brake shoe 50 to the drum 49 to hold the main motor rotor 48 stationary.

The brake shoe 50 is not intended as a means for stopping the motion of the rotor 48; that is, it is not a brake to absorb kinetic energy of the rotating parts; it is only a holding brake for holding the rotor 48 at zero speed. The rheostat 95 is now operated to shift the arms 109 and 110 toward the position shown in solid lines in Figure 1. It can be seen that a potential will appear upon the leads 111 and this is applied to the field 103 of the exciter 101 and it in turn excites the field 114 of the direct current generator 100 resulting in a current flow through the leads 115, 116 and the series field 57 and armature 98 of the variable speed motor 18. The armature 98 is turned and since the rotor 48 at the main motor 12 and its sun pinion 10 are held stationary, starting of the pinion 19 results in driving the orbit gear 15 and rolling of the planet gear 9 about the sun pinion 10, thereby driving the gears 8, 9 and the axle at reduced speed.

Now assuming that the speeds and gear ratios are so selected that 100% speed change in the variable speed motor 18 produces a 20% speed change in the load, it will be seen that by acceleration of the motor 18, the load speed may be increased from zero percent to 20% of maximum. The first step in acceleration of the load may be seen in Figure 9 in the first part of the curve in a forward direction indicated by reference letter A. It is to be noted that the curve of Figure 9 is based upon constant torques. In practice this is not exactly the case but the general character of the curve is not greatly altered in the case of a railroad load on level track.

In practice the speeed of the variable speed motor 18 is made such that it will slightly exceed the stated 20% for the reason that the load might slow down before the next step occurs. The controller having closed switch 52 to apply the brake then shifts the rheostat arms 109, 110 to cause the generator 100 to supply current to motor 18 through series field 57. The separately excited field 56 is given constant excitation by exciter 102.

As the motor 18 is speeded up it accelerates the load toward the 20% speed which this motor 18 is capable of and designed to impart to the load. As a series motor it may not bring the load up to the full 20% speed, because of the heavy field excitation. Hence, just before the controller has shifted the rheostat 95 to full forward position the controller causes the switch 58 to cut out the series field 57 leaving the separately excited field 56 in control of the motor 18. It will then speed up to the speed predetermined by the design, that is to a speed great enough to equal and slightly exceed the 20% load speed requirement. As the controller brings the rheostat 95 to full speed position it releases brake 50 by opening switch 52.

By putting the motor 18 under control of the separately excited field it can be seen that the speed of that motor is definitely related to the position of the controller arms 109, 110 of the rheostat 95 and this relation remains throughout subsequent operations except as the speed of the load is again brought back to the point where the brake is applied and the series field again put into control.

If desired the switch 58 may not be closed on reverse motion of the controller to zero so that regenerative braking by the separately excited motor 18 may be carried down through the lower 20% of load speed.

Continuing the matter of acceleration of the load, assume that the load has been brought up to 20% speed and the controller is shifted further and assume that the speed of the motor 18 now drops to zero as the rheostat 95 is moved in the opposite direction as above indicated, the brake shoe 50 being released, the momentum of the locomotive in its forward travel at 20% full speed will now drive the rotor 48 of said motor 12 at a speed which corresponds to half of its lower fixed speed. For example, if the motor 12 is adapted to operate at 600 R. P. M. at its lower speed, it will now under the influence of the forward motion of the locomotive and zero motion of the variable speed motor 18 be rotating at approximately 300 revolutions per minute.

As the controller arms 109 and 110 of the rheostat 95 are moved to reverse the direction of rotation of the armature 98, the rotor 48 of the main motor 12 will be accelerated and as a result when the motor 18 is moving at approximately its maximum speed in a reverse direction, the rotor 48 will be moving at full speed, for example, 600 R. P. M., and by means of suitable synchronizing mechanism, not herein shown, but disclosed in my copending application Serial No. 365,832, filed May 25, 1929, the switch 53 for the lower speed of the motor 12 may be closed and the rotor 48 driven at the lower fixed speed of 600 R. P. M.

Now the rheostat 95 is again adjusted by moving the arms 109 and 110 towards the neutral position, tending to bring the armature 98 to zero speed and thereby causing the alternating current motor 12, that is, the main fixed speed motor to pick up the load and to accelerate the load as the variable speed motor 18 is decelerated. The part of the acceleration or power demand curve shown in Figure 9 corresponding to this action is indicated by reference letter B.

Continued motion of the rheostat arms 109 toward the position shown in full lines, that is, for driving the variable speed motor 18 by power taken through the motor generator set will result in adding the speed of the variable speed motor to the speed of the fixed speed motor 12. This part of the curve is indicated by the line C on Figure 9.

Next the controller is operated to open the switch 53 of the main fixed speed motor 12 and then the rheostat 95 is adjusted through zero to substantially full speed of the motor 18 in the reverse direction. As the motor 18 comes to zero speed when the rheostat is in neutral position, the momentum of the locomotive will drive the rotor of the main motor 12 at substantially 900 revolutions per minute. By reference to Figure 10, it will be seen that the alternating current motor 12 is here to be brought to its second fixed speed and this is done by freeing the rheostat arms 109, 110 to full reverse position, whereupon the rotor 48 of the motor 12 will have attained substantially its second fixed speed and then the switches 54 and 55 are closed to connect the stator windings in multiple and to drive the motor 12 at its higher fixed speed of, for example, 1200 R. P. M. These switches may be automatically closed by suitable synchronizing mechanism when the speed of the rotor corresponds to a predetermined value.

Thereupon the controller is operated to adjust the rheostat 95 to swing the contact arms 109, 110 towards the neutral position decelerating the rotor 98 and accelerating the load. This part of the acceleration is represented by the line D on the curve of Figure 9.

When the armature 98 of variable speed motor 18 is held at substantially zero speed, the main motor 12 drives the load at 80% of its full speed and supplies all of the power. Then as the rheostat is moved further to drive the motor 18 in a forward direction, the speed of the variable speed motor 18 will be added to that of the fixed speed motor 12 in accordance with the part of the curve reprsented by line E. When the rheostat has been adjusted to drive the motor 18 at its top speed, the load is moving at 100% speed.

From the curve of Figure 9, it will be understood that the capacity of the variable speed motor 18 need only be one-fifth of the power requirement of the load. Obviously this relation may be varied and if the fixed speed motor 12 had a third fixed speed, say at 1800 revolutions per minute, the same variable speed motor might be employed for two further steps and its power in proportion to the maximum power demand of the load would be as one to seven.

If the load were to be driven in the reverse direction, it will be apparent that the leads to the fixed speed motor 12 may be reversed as through the switches 96, 97 and the connections of the armature 98 are likewise reversed by operation of the reverse switch provided in conjunction with the controller. Then the same mode of operation except in the reverse direction as indicated by the left-hand part of the curve of Figure 9 may be carried out.

Figure 10 shows the steps of speed of the fixed speed motor and Figure 11 indicates the speed of the variable speed motor throughout the range indicated by Figure 9. The solid diagonal lines indicate positive work done by the variable speed motor and the dotted diagonal lines indicate the negative work done by the variable speed motor. The vertical lines indicate merely the change in speed where the variable speed motor is idly driving the fixed speed motor.

It is to be noted that in order for the fixed speed motor to drive the load, the torque of such fixed speed motor must be sustained by the variable speed motor through the gearing that is at whatever mechanical advantage it is geared to operate. Therefore, during the stages of operation indicated at the section B and D, the variable speed motor must sustain the torque of the fixed speed motor, although the variable speed motor is operating in the reverse direction, that is, as a generator. When the variable speed motor 18 operates as a generator, current generated thereby flows in th series circuit 115, 116 connecting the motor 18 with the generator 100, and the said generator 100 is driven as a motor and the alternating current motor 61 is driven acting as a generator to regenerate the power taken from the fixed speed motor 12 by the variable speed motor 18.

It is known that a squirrel cage alternating current motor driven at a speed in excess of synchronism and connected to a line having synchronous apparatus thereupon will deliver power to the line.

If the motor 61 be a synchronous motor the field may be suitably excited in order to provide a leading component to the line to improve power factor and regulation.

The above facts relating to the regeneration of power by driving an induction motor above a synchronous speed shows at once the inherent capability of this apparatus in a locomotive to regenerate kinetic energy of the load. That is to say, the locomotive driven by this system can regenerate and return to the line a large part of its kinetic energy.

Likewise upon descending a grade, the energy available from the descent of the load under gravity may be regenerated by causing the drag of the motors 12 and 18 acting as generators to be imposed upon the moving load.

In the construction of the locomotive suitable instruments are placed before the operator to indicate the rate of regeneration so that the electrical apparatus will not be overloaded.

It is to be noted that the short circuiting switch 58 for the series field remains closed until the controller comes down to the part of the curve indicated by the line A where the switch 58 is automatically opened and at this point regenerative braking is made unstable by the differential effect of the series field. It is terminated by applying the air brake which is interlocked with the A. C. motor control. Thus according to this scheme a wide range of regeneration is possible. Not only is the drive efficient over all known schemes of alternating current drives as a drive, but as a regenerative brake it has a much wider range of operation than any known scheme.

While the above description has been given with three phase operation in mind, the same mode of operation may be carried through on single phase operation. That is to say, assume that the switches 72 and 75 are opened and the switches 73, 74 and 76 are closed, as may be done automatically through suitable track contacts or the like, the drive may be controlled in precisely the same manner either for forward or reverse drive on reduced power.

If the circuit should be opened while the locomotive is on single phase operation, it may be put into operation again by starting the exciter motor generator set 60 through a suitable storage battery connected, for example, to the leads 106 of the exciter 102. The storage battery 120 may be floated on the line of the exciter 102 and may be used as a starting battery. Also it may supply light and auxiliary service throughout the locomotive or all connected units.

When the transformer is connected for single phase operation, its primaries are connected as shown in Figure 1—B and in this connection approximately 60% of full three phase power will be available. While I have indicated phase to ground operation, it is to be understood that straight single phase, as for example between phase wires A and C may be employed instead. Also the entire system may be initially designed and operated as a single phase system of driving. The same inherent advantages will appear.

For multiple unit control, the field circuit of the D. C. generator 100 or of its exciter 101 as shown by leads 111 and the circuits which control the brakes and the speed connections of the A. C. motor are connected to the train-line circuits of each unit. When the train-line circuits of the several units are interconnected, any unit may be used as a center from which to control all the units.

I shall now give a brief résumé of the starting and speed control of a locomotive embodying my invention.

Résumé of motor operation

Assuming the fixed speed motor to have speeds of zero, 600 and 1200 R. P. M. the operations are graphically shown in Figures 9, 10 and 11.

Starting and speed control are accomplished in the following manner:

First, the motor generator set is started. From then on, it runs continuously while the locomotive is in service. The separately excited field of the motor 18 is then excited.

The brakes are applied to the A. C. traction motor 12 to keep it from revolving during the initial step of the speed cycle.

The field of the D. C. generator 100 is then built up until the motor 18 starts the locomotive. The excitation is then gradually increased to its maximum value. Finally the series field windings are short circuited by switch 58. This brings the locomotive up to 20% of its maximum speed.

With the locomotive running at 20% speed, the brake shoe 50 is released. The excitation of the D. C. generator 100 is then decreased to zero, then increased to maximum in the opposite direction. This causes the motor 18 to change its speed from maximum in one direction through zero to maximum in the opposite direction and in so doing it idles the motor 12 from zero speed up to its low speed rating 600 R. P. M. The A. C. circuit breaker 53 then closes on the 600 R. P. M. winding.

Next the excitation of the generator 100 is gradually decreased to zero, then increased to maximum in the opposite direction. This causes the motor 18 to bring the locomotive from 20% up to 60% speed. At this point, the circuit breaker 53 of the A. C. motor 12 opens. The excitation of the D. C generator 100 is then decreased to zero, then increased to maximum in the opposite direction thereby causing the motor 18 to idle the fixed speed motor 12 from 600 to 1200 R. P. M., when the A. C. circuit breakers 54 and 55 close on the 1200 R. P. M. windings. From this point of the cycle to 100% speed, the operation is similar to the step from 20% to 60%. The locomotive is brought up to speed in the reverse direction by reversing the A. C. motor leads at the switches 96 and 97, and the D. C. motor armature connections by a reversing switch, (not shown), then carrying through the same control cycle.

The controller not here shown but shown in a companion application consists of two separate units which are interconnected by gears and a reversing switch. One unit controls the direction of rotation and speed of the motor 18; the second unit controls the braking and switching of the motor 12. The switch for reverse operation is also mounted on and suitably interlocked with the controller. Preferably the controller is arranged for making the proper connections by a continuous motion of the controller handle in one direction so that all that the operator needs to do is to continue to advance the controller for accelerating the load and backing off the controller to apply regenerative braking.

In case of emergency one or more motors may be disconnected when the locomotive will operate with a proportional reduction in power. Unlike the D. C. series multiple system, any motor may be taken out of service without upsetting the balance of the speed control system.

While I have mentioned herein the means for supplying three phase alternating current as being preferably that shown in my copending application Serial No. 357,538, it is to be understood that I do not intend to limit the invention to that particular means. I may use a three phase three conductor trolley of any suitable design or I may employ a two conductor trolley with ground or track return, or any suitable means whatever for supplying the desired three phase current. Also I may operate the system of my invention on single phase current of any commercial frequency either as a two conductor trolley or a single conductor trolley with ground or track return or any suitable means whatever.

I consider the above described system of drive to be broadly new both as to apparatus and method of operation and intend to claim the same as such, disregarding such details of construction as will readily occur to those skilled in the art upon becoming acquainted with the invention.

I claim:

1. The method of accelerating a moving load by the use of two motors which consists in balancing the torques of the two motors differentially against the resistance of the load, holding the speed of one motor at zero and accelerating the other motor, releasing said one motor, reversing the other motor to maximum speed to idle the said one motor to a predetermined speed, energizing said one motor to drive it at said predetermined speed and decelerating the other motor to cause said one motor to accelerate the load.

2. The method of accelerating a moving load by the use of two motors which consists in balancing the torques of the two motors differentially against the resistance of the load, holding the speed of one motor at zero and accelerating the other motor, releasing said one motor, reversing the other motor to maximum speed to idle the said one motor to a predetermined speed, energizing said one motor to drive it at said predetermined speed and decelerating the other motor to cause said one motor to accelerate the load and then accelerating the said other motor for further accelerating the load.

3. The method of accerelating a load through a predetermined range of speed which comprises accelerating the load from a standstill by an adjustable speed motor driving in a forward direction, then applying the torque of a fixed speed motor to the load and to the adjustable speed motor and dividing the speed of said fixed speed motor between the load and the adjustable speed motor driven in reverse direction, then decelerating the adjustable speed motor to cause increase of speed of the load and then accelerating the forward speed of said adjustable speed motor and adding the speed of the same to the load.

4. The method of accelerating a load which consists in balancing the torque of the load against an adjustable speed motor and a fixed speed motor, holding the speed of the fixed speed motor at zero, accelerating the adjustable speed motor to drive the load through a first range of speeds, then driving the fixed speed motor at its fixed speed and by its power rotating the adjustable speed motor in a reverse direction, decelerating the adjustable speed motor to accelerate the load through a second range of speeds which are all higher than the first range of speeds.

5. The method of accelerating a load which consists in balancing the torque of the load against an adjustable speed motor and a fixed speed motor, holding the speed of the fixed speed motor at zero, accelerating the adjustable speed motor to drive the load through a first range of speeds, then driving the fixed speed motor at its fixed speed and by its power rotating the adjustable speed motor in a reverse direction, decelerating the adjustable speed motor to accelerate the load through a second range of speeds which are all higher than the first range of speeds, and then accelerating the adjustable speed motor in a forward direction to accelerate the load through a third range of speeds which are all higher than the second range of speeds.

6. The method of accelerating a moving load by the use of a motor of fixed speed type having two or more constant speeds and an adjustable speed motor which consists in balancing the torques of the two motors differentially against the resistance of the load, holding the speed of the fixed speed type motor at zero, accelerating the adjustable speed motor from zero to its maximum speed to accelerate the load through a first range of speeds, reversing the adjustable speed type motor to maximum negative speed and driving the fixed speed motor at its fixed speed, then decelerating the reverse speed of the adjustable speed motor to accelerate the load through a second range of speeds, then increasing the speed of the adjustable speed motor from zero to maximum in a forward direction to accelerate the load through a third range of speeds, then reversing the adjustable speed type motor to maximum speed and driving the fixed speed motor at a higher fixed speed, then decelerating the reverse speed of the adjustable speed motor to accelerate the load through a fourth range of speeds, and then accelerating the speed of the adjustable speed motor in a forward direction to accelerate the load through a fifth range of speeds.

7. The method of accelerating a moving load by the use of a motor of fixed speed type having two or more constant speeds and an adjustable speed motor which comprises balancing the torques of the two motors differentially against the resistance of the load, maintaining the fixed speed type motor at zero speed, accelerating the adjustable speed motor in a forward direction to accelerate the load through a first range of speeds, reversing the adjustable speed motor to maximum negative speed and driving the fixed speed type motor at its fixed speed, decelerating the reverse speed of the adjustable speed motor to zero by regenerative braking to accelerate the load through a second range of speeds, accelerating the adjustable speed motor to maximum in a forward direction to accelerate the load through a third range of speeds, reversing the adjustable speed motor to maximum reverse speed and driving the fixed speed type motor at a higher fixed speed, then decelerating the reverse speed of the adjustable speed motor to zero by regenerative braking to accelerate the load through a fourth range of speeds, then accelerating the adjustable speed motor in a forward direction to accelerate the load through a fifth range of speeds.

8. The method of driving a load at adjustable speed by the use of a main fixed speed type motor and an auxiliary adjustable speed motor which comprises balancing the torques of the motors against each other and against the resistance of the load, applying the speed of the auxiliary motor alone to the load and then applying the speed of the main motor to the load while subtracting to an adjustable degree the speed of the auxiliary motor, then adding the entire speed of the main motor and the speed of the auxiliary motor in adjustable amount to the load.

9. The method of covering an adjustable speed range of a driven element by the use of a main fixed speed type motor and a small adjustable speed motor which comprises balancing the torques of the two motors against each other and against the resistance of the load with a mechanical advantage for the adjustable speed motor, holding the fixed speed motor stationary and driving the load by the adjustable speed motor to any speed within its range, at maximum speed of the adjustable speed motor releasing the fixed speed motor, reversing the direction of rotation of the adjustable speed motor to bring the fixed speed motor to full speed, then energizing the fixed speed motor at full speed to drive the load and to drive the adjustable speed motor as a generator.

10. The method of covering an adjustable speed range of a driven element by the use of a main fixed speed motor and a small adjustable speed motor which comprises balancing the torques of the two motors against each other and against the resistance of the load with a mechanical advantage for the adjustable speed motor, holding the fixed speed motor stationary and driving the load by the adjustable speed motor to any speed within its range, at maximum speed of the adjustable speed motor releasing the fixed speed motor, reversing the direction of rotation of the adjustable speed motor to bring the fixed speed motor to full speed, then energizing the fixed speed motor at full speed to drive the load and to drive the adjustable speed motor as a generator, then decreasing the speed of the adjustable speed motor to zero to apply the full speed of the fixed speed motor to the load and then adding the speed of the adjustable speed motor to that of the fixed speed motor to drive the load at a speed higher than the corresponding speed of the fixed speed motor.

11. The method of braking a moving load which consists in balancing the motion of the load differentially against the motion of a fixed speed motor and the motion of an adjustable speed motor, driving the fixed speed motor as a generator at substantially a uniform speed and driving the adjustable speed motor at adjustable speeds and controlling the electrical power developed at the adjustable speed motor to a value which will hold the speed of the fixed speed motor at substantially a predetermined value.

12. The method of braking a moving load which consists in balancing the motion of the load differentially against the motion of a fixed speed motor and the motion of an adjustable speed motor, driving the fixed speed motor as a generator at substantially a uniform speed and driving the adjustable speed motor at adjustable speeds and controlling the electrical power developed at the adjustable speed motor to a value which will hold the speed of the fixed speed motor at substantially a predetermined value, and transforming the electrical power developed by the adjustable speed mo or into power of the same characteristic as the electrical power developed by the fixed speed motor.

13. In combination a driven member, an adjustable speed direct current motor, an alternating current motor of fixed speed type, means for balancing the torques of the two motors against each other and against the load, a brake for the alternating current motor means independent of the alternating current motor for supplying direct current to the direct current motor and means for controlling the speed and direction of drive of the direct current motor.

14. In combination a driven member, an adjustable speed separately excited type D. C. motor, a two speed A. C. motor, means for balancing the torques of the motors against each other and against the load differentially, a brake for the A. C. motor, means for changing the speed of the A. C. motor from one speed to the other means independent of the A. C. motor for supplying direct current to the D. C. motor and means for controlling the direction and speed of drive of the D. C. motor.

15. In combination a driven member, a D. C. separately excited motor, a two speed A. C. motor, means for balancing the torques of the motors against each other and against the load, a brake for the A. C. motor, means for changing the speed of the A. C. motor from one speed to another, means for exciting the field of the D. C. motor in one direction and means for varying the potential and polarity of the current supplied to the D. C. motor armature.

16. In combination a driven member, a D. C. separately excited motor, and A. C. motor having a plurality of fixed speeds, means for balancing the torques of the motors against each other and against the load, means for changing the speed of the A. C. motor from one speed to another, means for supplying substantially constant field excitation for the D. C. motor and means for varying the potential and polarity of the current supplied to the D C. motor armature.

17. In combination a driven member, an A. C. motor, a D. C. motor, means for balancing the torques of the motors against each other and against the resistance of the driven member, a source of alternating current for the A. C. motor, means for transforming alternating current from said source into direct current for the D. C. motor, said means being reversible to transform direct current from the D. C. motor into alternating current and circuit changing means for independently varying the speed and direction of drive of each motor.

18. In combination a driving shaft, a D. C. motor, an A. C. motor, said shaft being differentially connected to both of said motors, a reversible converting device for converting alternating current to direct current and vice versa, a source of alternating current connected to said A. C. motor and to said device, means controlling the distribution of power to said A. C. and said D. C. motors and means for varying the speed of both motors.

19. In combination, a shaft, an A. C. motor, a D. C. motor, said shaft being differentially connected to said motors, a motor generator set having an A. C. motor and a D. C. generator, said A. C. motors being connected together and adapted to be supplied with alternating current, said D. C. generator being connected in series with said D. C. motor, means for controlling the power flow in said series circuit and means for adjusting the speed of the first said A. C. motor.

20. In combination, a shaft, a squirrel cage A. C. motor, said motor having connections for changing from one fixed speed to another, a separately excited D. C. motor, said motors being differentially connected to each other and to the shaft, braking means for the A. C. motor, switching means for changing the connections of the A. C. motor to drive it at different fixed speeds, a motor generator set having an exciter, a field for the D. C. motor connected to said exciter, a generator driven by the motor generator set, a controlling rheostat supplied from the exciter for controlling the field of the D. C. generator and a series circuit including the armature of the D. C. motor and D. C. generator.

21. In combination, a shaft, a squirrel cage A. C. motor, said motor having connections for changing from one fixed speed to another, a separately excited D. C. motor, said motors being differentially connected to each other and to the shaft, braking means for the A. C. motor, switching means for changing the connections of the A. C. motor to drive it at different fixed speeds, a motor generator set having an exciter, a field for the D. C. motor connected to said exciter, a generator driven by the motor generator set, a controlling rheostat supplied from the exciter for controlling the field of the D. C. generator and a series circuit including the armature of the D. C. motor and D. C. generator, and a storage battery cooperating with said exciter and adapted to start the motor generator set for single phase operation.

22. Method of regenerative braking a moving load to decelerate the same which comprises balancing the motion of the load differentially against the motion of a fixed speed type motor and the motion of an adjustable speed motor, then throughout one range of speeds of the load driving the fixed speed type motor at a fixed speed and the adjustable speed motor as a generator at decreasing speed until said decreasing speed reaches substantially zero, then accelerating the adjustable speed motor in the reverse direction toward maximum throughout a lower range of speeds of the load.

23. Method of regenerative braking a moving load to decelerate the same which comprises balancing the motion of the load differentially against the motion of a fixed speed type of motor adapted to have two or more constant speeds and the motion of an adjustable speed motor, then throughout one range of speeds of the load driving the fixed speed type motor at a fixed speed and the adjustable speed motor as a generator at decreasing speed until said decreasing speed reaches substantially zero, then accelerating the adjustable speed motor in the reverse direction toward maximum throughout a lower range of speeds of the load, then changing the speed of the fixed speed type motor to a lower value and through a still lower range of speeds of the load driving the adjustable speed motor at decreasing speed.

24. Method of regenerative braking a moving load to decelerate the same which comprises balancing the motion of the load differentially against the motion of a fixed speed type motor adapted to have two or more constant speeds and the motion of an adjustable speed motor, then throughout one range of speeds of the load driving the fixed speed type motor at a fixed speed and the adjustable speed motor as a generator at decreasing speed until said decreasing speed reaches substantially zero, then accelerating the adjustable speed motor in the reverse direction toward maximum throughout a lower range of speeds of the load, then changing the speed of the fixed speed type motor to a lower value and through a still lower range of speeds of the load driving the adjustable speed motor at decreasing speed until said decreasing speed reaches substantially zero, then accelerating the adjustable speed motor toward maximum throughout a still lower range of speeds of the load.

25. Method of regenerative braking a moving load to decelerate the same which comprises balancing the motion of the load differentially against the motion of a fixed speed type motor adapted to have two or more constant speeds and the motion of an adjustable speed motor, then throughout one range of speeds of the load driving the fixed speed type motor at a fixed speed and the adjustable speed motor as a generator at decreasing speed until said decreasing speed reaches substantially zero, then accelerating the adjustable speed motor in the reverse direction toward maximum throughout a lower range of speeds of the load, then changing the speed of the fixed speed type motor to a lower value and through a still lower range of speeds of the load driving the adjustable speed motor at decreasing speed until said decreasing speed reaches substantially zero, then accelerating the adjustable speed motor toward maximum throughout a still lower range of speeds of the load, then dropping the speed of the fixed speed type motor to substantially zero and throughout a still lower range of speeds of the load driving the adjustable speed motor as a generator at decreasing speed.

26. Method of regeneratively braking a moving load which comprises balancing the motion of the load differentially against the motion of an A. C. motor of the fixed speed type and the motion of a D. C. motor of adjustable speeds type, driving the A. C. motor as a generator at a fixed speed and driving the D. C. motor at a mechanical advantage as a motor at any selected speed within its range to maintain the fixed speed of the A. C. motor to cause it to regenerate power from the load.

27. The method of generating alternating current of fixed frequency with a squirrel cage induction motor which consists in exciting the motor with fixed frequency alternating current, driving said motor at adjustable speed, and supplementing the speed of said alternating current motor by positive or negative speed by means of an adjustable speed direct current dynamo electric machine.

28. An adjustable speed A. C. drive adapted for traction purposes comprising the combination of means for supplying alternating current, a load shaft adapted to be connected to a live load, a D. C. motor having a drive shaft, a main A. C. motor of the fixed speed type connected in differential relation between the drive shaft of the D. C. motor and the load shaft, a motor generator set having an A. C. motor connected to said A. C. supply means and having a D. C. generator connected in series with the D. C. motor, a separately excited field for said D. C. motor, a separately excited field for said D. C. generator, a controlling rheostate for controlling by gradual steps the polarity and intensity of the excitation of the D. C. generator, braking means for holding the parts of the A. C. motor against relative rotation to permit the load to be started by the D. C. motor, the D. C. motor being operable additively as a motor and subtractively as a generator in combination with the A. C. motor for either driving the load or for regeneratively braking the same.

In witness whereof I hereunto subscribe my name this 1st day of May, A. D. 1929.

ALLEN M. ROSSMAN.